United States Patent [19]

Richardson et al.

[11] 4,387,572
[45] Jun. 14, 1983

[54] TURBOCHARGER CONTROL SYSTEM

[75] Inventors: Neil R. Richardson, Palos Verdes Estates; Bradley A. Woodhull, Fullerton, both of Calif.

[73] Assignee: The Garrett Corporation, Los Angeles, Calif.

[21] Appl. No.: 261,585

[22] Filed: May 7, 1981

[51] Int. Cl.³ ............................................ F02B 37/12
[52] U.S. Cl. ...................................................... 60/602
[58] Field of Search ................ 60/600, 601, 602, 603, 60/611; 123/564

[56] References Cited

U.S. PATENT DOCUMENTS

| | | | |
|---|---|---|---|
| 1,816,787 | 7/1931 | Moss . | |
| 2,283,175 | 5/1942 | Berger . | |
| 2,417,363 | 3/1947 | Holley | 60/602 X |
| 2,484,852 | 10/1949 | Paget . | |
| 2,573,231 | 10/1951 | Teague, Jr. . | |
| 2,576,516 | 11/1951 | Jurs . | |
| 2,621,472 | 12/1952 | Udale | 60/600 |
| 2,811,826 | 11/1957 | Alcock | 60/600 |
| 2,890,714 | 6/1959 | Greenwood et al. . | |
| 3,035,408 | 5/1962 | Silver | 60/602 |
| 3,096,614 | 7/1963 | Silver et al. . | |
| 3,102,382 | 9/1963 | Bozzola | 60/602 |
| 3,221,763 | 12/1965 | Widdowson . | |
| 3,365,878 | 1/1968 | Powell et al. . | |
| 3,478,775 | 11/1969 | Friedell . | |
| 3,611,711 | 10/1971 | Mueller | 60/602 |
| 4,075,849 | 2/1978 | Richardson | 60/602 |
| 4,120,156 | 10/1978 | McInerney | 60/602 |
| 4,197,711 | 4/1980 | Fuhrmann et al. | 60/602 |

FOREIGN PATENT DOCUMENTS

| | | |
|---|---|---|
| 2442151 | 3/1976 | Fed. Rep. of Germany . |
| 2823067 | 12/1978 | Fed. Rep. of Germany ........ 60/600 |

OTHER PUBLICATIONS

SAE #546A, Jun. 1962, Technical Article entitled: Turbocharger Controls, by R. L. Cholvin.

Primary Examiner—Michael Koczo
Attorney, Agent, or Firm—James W. McFarland; Albert J. Miller; Stuart O. Lowry

[57] ABSTRACT

A control system is provided for controlling a turbocharger in a turbocharged engine in response to engine power setting when the engine is operated at a power level above a selected minimum or relatively low power level and in response to altitude when the engine is operated at the low power level. A primary controller controls the position of a waste gate valve to control turbocharger compressor discharge pressure in response to engine throttle setting when the engine is operated above the low power level, and a pair of secondary controllers control the position of the valve in response to altitude when the engine is operated at the low power level to control the compressor discharge pressure in a selected manner up to a predetermined altitude and to vary the discharge pressure as a selected function of altitude above the predetermined altitude.

35 Claims, 3 Drawing Figures

TURBOCHARGER CONTROL SYSTEM

BACKGROUND OF THE INVENTION

This invention relates to devices and systems for controlling the operation of a turbocharger in response to variations in engine power and altitude. More specifically, this invention relates to an improved control system for selective control of the compressor discharge pressure of a turbocharger, particularly of the type used in conjunction with engines for small aircraft.

Turbochargers in general are well known in the art and comprise a rotating assembly driven by exhaust gases expelled from an internal combustion engine. The rotating assembly includes a turbine rotatably driven by the exhaust gases and mounted on a common shaft with a compressor, whereby rotation of the turbine causes a corresponding rotation of the compressor. The compressor functions to draw in and compress air and to supply the compressed air, commonly referred to as "charge air", to the engine. Accordingly, the turbocharger operates to supply increased quantities of air to the engine to allow the engine to burn proportionally increased quantities of fuel to achieve a higher engine power output.

When the turbocharged engine is used to power an aircraft, the turbocharger and the engine are subject to frequent and substantial variations in altitude. If the turbocharger is allowed to operate in a free floating or uncontrolled manner, the power assist provided by the turbocharger is a maximum at sea level operation and full engine power. As altitude increases, the availability of air for compression decreases, as evidenced by a reduction in ambient pressure, resulting in a substantial drop-off in the pressure level of the charge air. Thus, the quantity of air supplied to the engine decreases significantly with increases in altitude to substantially decrease engine power and performance. Accordingly, it has been desirable to control the turbocharger in a manner to maintain the charge air at a substantial pressure throughout a range of anticipated altitudes of operation, and thereby prevent undesirable decreases in engine power.

Turbocharger control schemes in general typically require use of a turbocharger capable of providing charge air at a pressure substantially in excess of safe design limits for the turbocharger and/or the engine during sea level operation at full engine power. A control valve is provided to control operation of the turbocharger in a manner to limit the charge air pressure to a desired magnitude for supplying the desired power assist to the engine without exceeding the safe design pressure limit. This control valve commonly comprises a so-called waste gate valve positioned to open a passage for bypass of a portion of the engine exhaust gases around the turbine away from driving communication therewith whereby the turbocharger is rotatably driven at less than maximum speed. A controller device responsive to selected engine system parameters progressively closes the control valve upon increases in altitude to increase the proportion of the exhaust gases driving the turbine to increase turbocharger speed and maintain charge air pressure substantially at the desired magnitude.

A variety of specific controller devices are well known in the art. For example, one such controller device comprises a so-called pressure ratio controller which modulates the position of the control valve to maintain a fixed pressure ratio between ambient pressure at the intake side of the turbocharger compressor and charge air pressure at the discharge side of the compressor. Another controller device comprises a so-called pressure differential controller designed to adjust the position of the control valve to maintain a fixed pressure difference across the turbocharger compressor. However, both of these controller devices are responsive directly to ambient pressure which decreases upon increases in altitude, resulting in a corresponding and undesirable drop-off in charge air pressure upon increases in altitude. Accordingly, to prevent this reduction in charge air pressure as a function of altitude, so-called absolute pressure controllers have been designed to adjust the position of the control valve in response to altitude in a manner to maintain compressor discharge pressure substantially constant throughout a range of altitudes. For a discussion of these various types of controller devices, see S.A.E. Technical Paper 546 A, June 1962, entitled "Turbocharger Controls", authored by Robert L. Cholvin.

The turbocharger controller devices discussed hereinabove are utilized to provide a fixed upper end limit on the pressure of the charge air supplied by the turbocharger. More specifically, when the engine is operated at or near a full power setting up to a predetermined design altitude, these devices progressively close the control valve to maintain the charge air pressure at or near, but not exceeding, the upper end limit. However, at altitudes above the design altitude, the control valve is maintained in a fully closed position whereby the turbocharger operates in a free floating manner to provide charge air at a pressure which decreases nonlinearly in accordance with compressor performance capability upon further increases in altitude. Similarly, when the engine is operated at lower altitudes and at lower power settings, these controller devices move the control valve toward the fully closed position in an effort to maintain charge air pressure as close as possible to the upper end limit. For power settings wherein the control valve is closed, however, control over turbocharger operation is lost and the turbocharger operates in a free floating manner.

In an attempt to improve control over turbocharger operation, some controller devices have been developed for adjusting the position of the control valve in response to engine power setting. See, for example, U.S. Pat. No. 3,611,711. These devices operate to reduce the charge air pressure upper end limit in response to reductions in engine power setting to maintain the control valve in an at least slightly open position throughout a broader range of engine operation. However, such power-responsive devices also operate to progressively close the control valve upon increases in altitude with the turbocharger operating in a free floating manner as soon as the control valve reaches the fully closed position. Unfortunately, the altitude at which the control valve reaches the closed position is frequently less than a desired altitude of operation.

In many turbocharged engine-driven aircraft, a portion of the charge air pressure from the turbocharger compressor is utilized for pressurization of the passenger cabin in the aircraft. When the charge air pressure is substantially in excess of the desired pressure for the cabin, an outflow valve is conventionally used to prevent cabin over pressurization. However, when the turbocharger is operated in a free floating mode at sufficient altitude and/or at a relatively low engine power setting, the charge air pressure can be insufficient to maintain sea level pressurization of the cabin. In this mode, the charge air pressure fluctuates with variations in altitude, as well as other system parameters such as fuel flow, engine temperature, ambient temperature, engine speed, and the like, resulting in significant passenger discomfort.

This passenger discomfort can be minimized by preventing turbocharger operation in the free floating mode, thereby isolating the charge air pressure from fluctuations in response to parameters other than altitude. Prior art turbocharger control systems, however, have not been capable of fulfilling this need up to altitudes now required. The present invention, therefore, provides a turbocharger control system for optimizing full range control over turbocharger operation throughout ranges of altitude and engine power now required.

SUMMARY OF THE INVENTION

In accordance with the invention, a turbocharger control system is provided for controlling a turbocharger in response to altitude and engine power setting. The control system comprises a primary controller such as an engine power setting responsive controller device for controlling the pressure of charge air provided by the turbocharger throughout a range of engine power settings above a predetermined minimum or low engine power setting. A pair of secondary controllers are provided for controlling the charge air pressure as one function of altitude up to a predetermined altitude, and as a second function of altitude above the predetermined altitude when the engine is operated at the low power setting.

In a preferred embodiment, a control valve is responsive to the primary and the secondary controllers to control operation of the turbocharger. The control valve comprises a waste gate valve movable between an open position opening a passage allowing bypass of a portion of the engine exhaust gases away from driving communication with the turbocharger turbine, and a closed position closing the bypass passage to direct all of the exhaust gases into driving communication with the turbine. The control valve is positionally adjusted by a positioning device which responds to the pressure of an hydraulic fluid, such as engine oil, wherein the pressure of the fluid is controlled by the primary controller and the two secondary controllers.

The primary controller is coupled between the positioning device and an hydraulic fluid drain, and the two secondary controllers are coupled in parallel between the primary controller and the drain. These controllers respond to the engine power setting and altitude of operation to adjust the flow of hydraulic fluid from the positioning device to the drain, and thereby control the pressure of the hydraulic fluid acting upon the positioning device. The positioning device operates to position the waste gate valve in an open position when the fluid pressure is relatively low, and to close the valve when the fluid pressure is relatively high.

When the engine is operated at a power setting above the predetermined low power setting, the primary controller governs flow through the positioning device in a manner to adjust the waste gate valve for maintaining charge air pressure substantially at an upper end limit selected for each engine power setting. At the low power setting, however, one of the secondary controllers overrides the primary controller and controls flow through the positioning device for positioning the waste gate valve in a manner to maintain charge air pressure substantially constant up to a predetermined altitude. The other secondary controller then assumes control over the fluid flow to maintain the waste gate valve in an at least partly open position for a range of altitudes above the predetermined altitude.

Other features and advantages of the present invention will become more apparent from the following detailed description, taken in conjunction with the drawings, which illustrate the principles of the invention.

BRIEF DESCRIPTION OF THE DRAWINGS

The accompanying drawings illustrate the invention. In such drawings.

DETAILED DESCRIPTION OF THE PREFERRED EMBODIMENT

Figure 1:
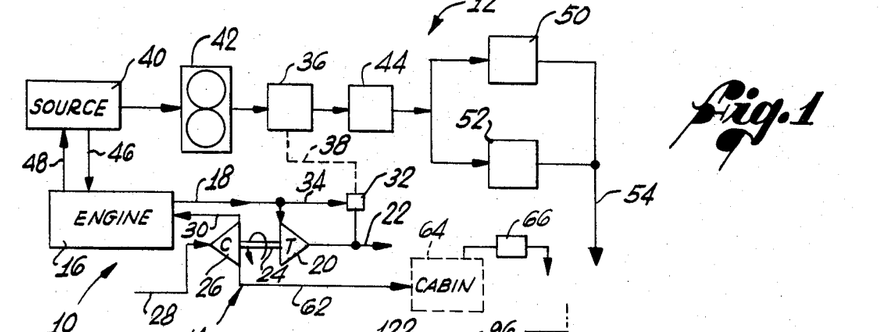
FIG. 1 is a schematic diagram illustrating a turbocharged engine system including a control system embodying the novel features of this invention.

A turbocharged engine system 10 is illustrated in FIG. 1 including a control system 12 embodying the novel features of this invention. In particular, the control system 12 is provided for controlling the operation of a turbocharger 14 in response to engine power setting when the power setting is above a predetermined minimum or relatively low power setting. At the relatively low power setting, the control system 12 controls the turbocharger 14 in response to altitude in a first mode up to a predetermined altitude and in a second or different altitude-responsive mode for altitudes above the predetermined altitude.

The turbocharged engine system 10 includes an internal combustion engine 16 intended for use within a relatively broad altitude range, such as, for example, a reciprocating engine of the type used to power small aircraft. The turbocharger 14 operates in conjunction with the engine 16 to supply the engine with relatively high pressure charge air to enable the engine to operate at relatively high power output levels. More specifically, exhaust gases from the engine 16 are coupled through an exhaust conduit 18 to a turbine 20 of the turbocharger 14 to rotationally drive the turbine 20 prior to discharge of the exhaust gases to atmosphere via an outlet conduit 22. The rotating turbine 20 is connected by a shaft 24 to a compressor 26 of the turbocharger, and thereby rotationally drives the compressor. The compressor in turn draws in ambient air through an inlet 28 and compresses that air to provide the charge air for supply through a supply conduit 30 to the intake of the engine 16. The charge air is, of course, combusted within the engine along with an appropriate supply of fuel resulting in the generation of power and the formation of exhaust gases which are directed through the exhaust conduit 18 to drive the turbocharger 14.

As is conventional in the art, the turbocharger 14 is designed to be capable of providing charge air to the engine 16 at a pressure exceeding some arbitrary design limit during sea level operation at full engine power. However, to prevent the charge air pressure level from exceeding this predetermined magnitude, typically a pressure level which the mechanical components can safely withstand, a control valve is provided to restrict turbocharger operation to a level below its performance capability. As illustrated, this control valve comprises a so-called waste gate valve 32 positioned along a bypass conduit 34 communicating between the exhaust conduit 18 and the outlet conduit 22. This waste gate valve 32 operates, when in an open position, to permit a portion of the exhaust gases to bypass the turbine 20 whereby the turbine is rotationally driven at a reduced speed resulting in a corresponding reduction in rotational speed of the compressor 26 and control of the pressure level of the charge air supplied thereby.

A positioning device 36 is coupled in a suitable manner, as illustrated by the dashed line 38 in FIG. 1, to modulate the position of the waste gate valve 32 between an open position permitting free flow of exhaust gases through the bypass conduit 34 and a closed position restricting the entire mass flow of exhaust gases to passage into driving communication with the turbine 20. This positioning device, in the embodiment shown, is responsive to the pressure of an hydraulic fluid to controllably open and close the waste gate valve 32, wherein the pressure of the hydraulic fluid is controlled in accordance with the power setting and altitude-sensing operation of the control system 12 of this invention, as will be described in detail.

The hydraulic fluid is supplied under pressure from a source 40 to the positioning device 36 by a pump 42, which is illustrated schematically in the form of a gear pump. Conveniently, the source 40 of hydraulic fluid can comprise a reservoir of lubricating oil for the engine 16 wherein a substantial portion of the oil is circulated to and from the engine through conduits 46 and 48. The flow of the hydraulic fluid through the positioning device 36, and hence the pressure of the hydraulic fluid in the positioning device, is controlled by the control system 12 of this invention. When the fluid flow is relatively high, the pressure in the positioning device is relatively low, resulting in movement of the waste gate valve 32 to a position allowing maximum bypass of exhaust gases away from driving communication with the turbine 20. When the fluid flow is restricted or closed off, the pressure in the positioning device increases to cause movement of the waste gate valve 32 toward and eventually to a fully closed position. For a more detailed description of the positional adjustment of a waste gate valve in response to varying hydraulic fluid pressure, see U.S. Pat. No. 3,096,614, assigned to the assignee herein.

In accordance with the invention, the control system 12 includes a primary controller 44 and a pair of secondary controllers 50 and 52 for controlling the flow of the hydraulic fluid from the positioning device 36 to a drain 54 for subsequent return to the source 40. As illustrated in FIG. 1, the primary controller 44 is coupled to the downstream side of the positioning device 36, and the two secondary controllers 50 and 52 are coupled in parallel with each other between the primary controller 44 and the drain 54. In operation, at engine power settings above the relatively low power setting, hydraulic fluid flow permitted by the primary controller 44 is less than the flow permitted by the secondary controllers 50 and 52, whereby the primary controller governs the flow of hydraulic fluid from the positioning device 36 to the drain 54. However, when the engine is operated at the relatively low power setting, the hydraulic fluid flow permitted by the primary controller 44 becomes greater than the flow permitted by the secondary controllers whereby the secondary controllers 50 and 52 override the primary controller and govern the flow of the hydraulic fluid to the drain.

More specifically, the primary controller 44 comprises a controller of the type well known in the art response to the power setting of the engine 16 to adjust the flow of the hydraulic fluid from the positioning device 36 as a function of engine power setting. For example, the primary controller 44 is typically responsive to the pressure difference across a throttle (not shown) for the engine wherein that pressure difference is representative of the engine power setting. While the particular primary controller or construction thereof is not disclosed or described in detail herein, one such controller is typefied by way of example in U.S. Pat. No. 3,611,711, which is incorporated by reference herein. An alternate controller construction is that sold by the Garrett Corporation under the designation number 470836.

Figure 3:
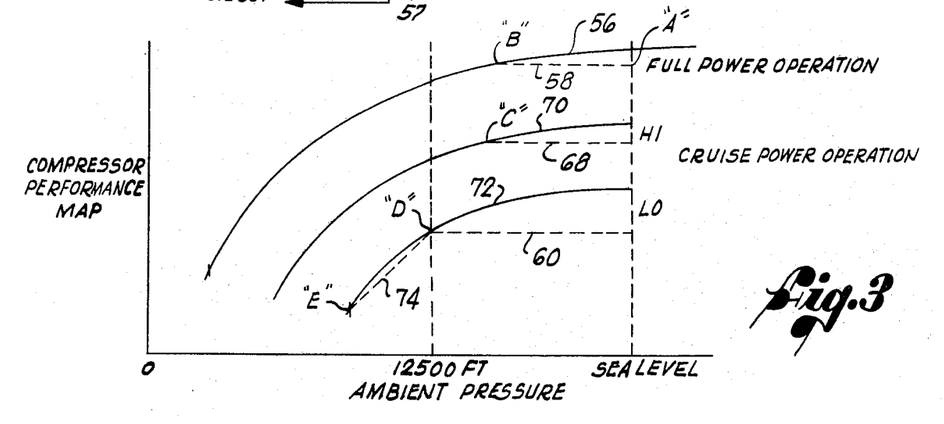
FIG. 3 is a graphic representation illustrating operation of a turbocharger in response to the control system.

With reference to FIG. 3, the primary controller 44 operates to allow a predetermined flow of hydraulic fluid from the positioning device 36 to the drain 54 to position the waste gate valve 32 in an at least partially open position when the engine is operated at a full power setting at sea level altitude. This partially open position at full power operation permits the turbocharger to provide charge air at a relatively high pressure for substantial power assist to the engine 16, as illustrated by the point "A" on the graph in FIG. 3. This pressure is slightly less than the performance capability of the compressor 26, as illustrated by the curved full power performance line 56 in FIG. 3, and the primary controller 44 adjusts the fluid flow through the positioning device 36 to cause progressive closing of the waste gate valve for maintaining the charge air pressure at a substantially constant level as illustrated by the dashed line 58 upon increases in altitude. The primary controller 44 maintains control over turbocharger operation until the waste gate valve reaches the fully closed position, as illustrated by the point of intercept (point "B" in FIG. 3) between the dashed line 58 and the full power performance line 56, after which the turbocharger operates in a free floating manner upon further increases in altitude.

The pressure of the charge air supplied during full power operation substantially exceeds ambient pressure at sea level, as indicated by the dashed line 60 in FIG. 3. Thus, when a portion of the charge air is supplied by the compressor 62 to the passenger cabin 64 of the aircraft for use in pressurizing the cabin, as illustrated in FIG. 1, the charge air pressure substantially exceeds that which is required to maintain the cabin at sea level pressure for maximum passenger comfort. Accordingly, as is well known in the art, an outflow valve 66 modulates in response to the higher charge air pressure to maintain the cabin 64 at a comfortable, substantially constant sea level pressure.

When a cruise altitude is reached subsequent to takeoff, the engine power setting is typically reduced by adjustment of the throttle to a lower, so-called cruise power setting. When this occurs, the primary controller 44 is adjusted in setting to allow a relatively higher hydraulic fluid flow from the positioning device 36 to the drain, whereby the charge air pressure is controlled to a relatively lower limit as illustrated by the dashed line 68 in FIG. 3. This limit is maintained for operation throughout an altitude range up to a point of intercept (point "C" in FIG. 3) with a compressor performance curve 70 corresponding with the cruise power setting. Once again, the primary controller 44 progressively adjusts the fluid flow to cause movement of the waste gate valve to the fully closed position after which the turbocharger operates in a free floating manner for further increases in altitude.

When the engine power setting is reduced to a minimum or relatively low power setting, such as upon descent, the primary controller 44 operates to further increase the hydraulic fluid flow from the positioning device 36 to adjust the waste gate valve 32 to yield a relatively low charge air pressure and resultant low power assist to the engine. This low charge air pressure level in accordance with the setting of the primary controller can be less than ambient pressure at sea level and thereby less than the desired pressurization level for the passenger cabin 64. Accordingly, the two secondary controllers 50 and 52 are provided to override the primary controller 44 in the low power setting mode by restricting flow of hydraulic fluid to the drain and thereby maintaining the waste gate valve in an at least partially closed position. These two secondary controllers 50 and 52 do not restrict the hydraulic fluid flow to the drain for higher engine power settings whereby they are overridden by the primary controller during such higher power settings.

More specifically, the secondary controller 50 comprises, in a preferred arrangement, an absolute pressure-type controller for maintaining the charge air at a substantially constant pressure level, as illustrated by the dashed line 60 in FIG. 3, sufficient to maintain the cabin pressure generally at sea level pressurization. The controller 50 includes means for comparing the charge air pressure with an absolute reference pressure, such as the pressure within an evacuated bellows, and for modulating the flow of the hydraulic fluid to the drain in a manner to progressively close the waste gate valve with increases in altitude to maintain the charge air pressure substantially constant. The secondary controller 50 operates to close off the fluid flow and move the valve 32 to the fully closed position at a predetermined altitude (12,500 feet in FIG. 3) corresponding with the intercept point (point "D" in FIG. 3) between the constant pressure line 60 and the compressor performance capability curve 72 at the low power setting.

The other secondary controller 52 is designed to allow hydraulic fluid flow to the drain 54 for altitudes above the intercept point "D", whereby control over the operation of the turbocharger 14 is maintained during high altitude operation. More specifically, the controller 52 allows fluid flow sufficient to return or maintain the waste gate valve 32 in an at least partly open position for a range of altitude operation above the predetermined altitude wherein the secondary controller 50 loses control over turbocharger operation. Thus, by maintaining the waste gate valve 32 in the partly open position, control is maintained over pressure of the charge air to isolate that pressure and variations therein from the complex and uncontrollable fluctuations which arise during free floating turbocharger operation. More specifically by maintaining the valve 32 in an at least partly open position, the charge air pressure is controlled according to the physical characteristics of the controller 52, and is isolated from uncontrolled fluctuations caused by engine temperature, fuel flow, etc. during free floating operation.

The second controller 52 is particularly designed to control the pressure level of the charge air as a predetermined and preferably linear function of ambient pressure variations incurred upon changing altitude. This linear function is illustrated in FIG. 3 by the dashed line 74 shown extending from the point of intercept "D" between the sea level constant absolute pressure depicted by the dashed line 60 and the compressor performance capacity curve 72 along a slope positioned slightly below the compressor performance curve. The specific slope is chosen to be as close as possible to the compressor performance curve 72 in order to maintain control over the turbocharger while permitting a maximum possible charge air pressure level. As illustrated, the second controller 52 controls the charge air pressure level as a decreasing function of increasing altitude since the compressor 26 is incapable of operation above the performance curve 72 and is thus incapable of maintaining the charge air pressure at the constant absolute pressure depicted by the dashed line 60 during high altitude operation. This decreasing linear function shown by the dashed line 74 intercepts the compressor performance curve 72 at some selected upper altitude, illustrated by point "E", which is typically chosen to be above a normal operating range for the aircraft.

Figure 2:
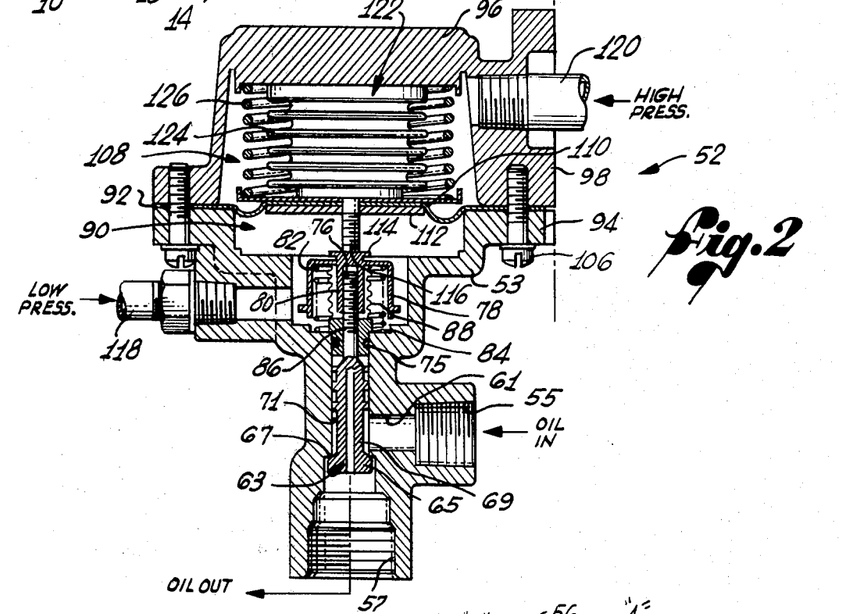
FIG. 2 is an enlarged fragmented vertical section illustrating a controller for use in the control system.

A preferred form of the second controller 52 is shown in detail in FIG. 2. As shown, the controller 52 comprises a lower housing 53 including an inlet port 55 and an outlet port 57 for respective reception of hydraulic fluid from the positioning device 36 and for communicating that hydraulic fluid to the drain 54. A valve passage 61 communicates between the inlet and outlet ports 55 and 57, and this valve passage 61 is selectively closed by a servo valve 63 having a valve head 65 positioned for seating upon a valve seat 67.

A valve stem 69 projects from the valve head 65 upwardly through a bore 71 and terminates in a threaded portion 76 for connection to an enlarged upper cap 78. This upper cap 78 has a generally downwardly open cup-shaped construction including a central threaded shank 80 which is threadably received over the threaded portion 76 of the valve stem 69. A compression spring 82 reacts between the cap 78 and a shoulder 84 on the lower housing 55 to urge the cap 78 and valve stem 69 in an upward direction to move the valve head 65 to a closed position seated upon the valve seat 67. Conveniently, a retainer 86 sealingly positions an O-ring 75 within the bore 71, and a sealing cylindrical bellows 88 is connected between the cap 78 and the retainer 86 to separate hydraulic fluid in the bore 71 from air within a lower chamber 90 in the controller.

The lower chamber 90 is formed at the upper end of the lower housing 55 and is closed on one side by a resilient diaphragm 92 which has a generally circular shape to overlie a peripheral flange 94 on the lower housing. An upper housing 96 includes a complementary peripheral flange 98, and a plurality of screws 106 interconnect the two flanges 94 and 98 to trap the diaphram 92 in position. Importantly, this upper housing 96 is shaped to define another enlarged chamber 108, the lower side of which is closed by the resilient diaphragm 92.

The central portion of the resilient diaphragm 92 is reinforced by a pair of reinforcing plates 110 and 112 which provide a rigid mouting base for a valve actuator 116 projecting downwardly from the center of the diaphragm 92 toward the cap 78 at the upper end of the servo valve 63. As illustrated, this valve actuator 116 bears against an abutment 114 on the cap 78 to urge the servo valve 63 in a downward direction within the bore 71. Such movement of the servo valve 63 spaces the valve head 65 from the valve seat 67 to allow flow of the hydraulic fluid between the inlet and outlet ports 55 and 57.

The diaphragm 92 is movably positioned in response to the relative pressures in the two chambers 90 and 108 to control the position of the servo valve 63. More specifically, an inlet fitting 118 communicates a relatively low pressure into the lower chamber 90 while an inlet fitting 120 communicates a relatively high pressure into the upper chamber 108. According to the invention, this low pressure comprises ambient pressure which varies inversely as a function of increasing altitude, while the high pressure comprises the charge air pressure provided by the turbocharger compressor 26.

A spring bellows assembly 122 is provided to bias the diaphragm 92 such that the servo valve 63 is operated according to a desired altitude-responsive function. This spring bellows assembly 122 comprises an evacuated bellows 124 secured between the upper housing 96 and the diaphragm 92 within the upper chamber 108, and a compression spring 126 reacting between the upper housing 96 and the reinforcing plate 110 on the upper side of the diaphragm. Thus, when the diaphgram 92 is subjected to ambient pressure and charge air pressure, the diaphragm 92 movably responds to those pressures and to the forces applied by the bellows 124 and the spring 126 to vary the position of the servo valve 63 in response to variations in altitude.

In operation, the various forces applied to the diaphragm 92 are chosen to vary the position of the servo valve 63 in a manner to adjust the position of the waste gate valve 32 to control charge air pressure as a linear function of ambient pressure. In particular, the specific relationship between charge air pressure and ambient pressure is chosen such that the servo valve modulates to an at least partly open position upon reaching the predetermined altitude where the waste gate valve 32 is closed by the first controller 48 (12,500 feet in the example illustrated in FIG. 3). This opening of the servo valve 63 allows a small flow of the hydraulic fluid through the positioning device 36 to the drain 54 whereby the waste gate valve 32 is at least partly opened thereby to maintain control over turbocharger operation. The servo valve 63 remains in the slightly open position according to the forces applied to the diaphragm 92 throughout a range of higher level altitudes to control the charge air pressure along the dashed line 74 in FIG. 3. When the arbitrary upper atitude is reached, as depicted by the point "E" in FIG. 3, the diaphragm 92 returns the servo valve 63 to the closed position. Similarly, when the aircraft returns to an altitude below the predetermind altitude of 12,500 feet, the diaphragm 92 returns the servo valve to the closed position whereby the secondary controller 52 loses control of the turbocharger and control by the other secondary controller 50 is resumed.

The specific design and operating characteristics of the second controller 52 can be readily tailored to provide the desired functional relationship between charge air pressure and ambient pressure representative of altitude. That is, the precise slope of this functional relationship can be predetermined in order to match the controlled charge air pressure level as close as possible to the compressor performance capacity curve 72 of the particular turbocharger compressor 26 at the low power setting. This tailoring is achieved by appropriate selection and adjustment of the effective areas of the diaphragm 92 and the evacuated bellows 124, and by selection of the force applied to the diaphragm 92 by the biasing spring 126. More specifically, from a knowledge of the charge air pressure level and the ambient pressure at any two points along the desired linear functional relationship between charge air pressure and ambient pressure, values for the areas of the diaphragm 92 and the bellows 24 and for the spring 126 can be derived to yield the selected altitude-sensitive operation.

The control system 12 of this invention thus provides apparatus and method for controlling the operation of a turbocharger throughout a wide range of engine power settings and altitudes. The invention is embodied in a primary controller 44 for controlling the tubrocharger in response to engine power setting whenever that power setting is above a predetermined minimum or relatively low power setting. At the low power setting, the primary controller 44 is overridden by the secondary controller 50 which maintains charge air pressure at a substantially constant level up to a predetermined altitude whereupon the other secondary controller 52 varies the charge air pressure as a function of altitutde variation within the limits of compressor performance capability at higher altitudes of operation. The invention thus allows full range altitude operation with maximum control of the turbocharger to prevent uncontrolled fluctuations in charge air pressure which tend to occur during free floating turbocharger operation.

A variety of modifications and improvements to the turbocharger control system described herein are believed to be apparent to one skilled in the art. Accordingly, no limitation on the invention or use thereof is intended, except by way of the appended claims.

What is claimed is:

1. In an engine system having an engine and a compressor for supplying charge air to the engine, a system for controlling compressor operation, comprising:
   valve means for controlling operation of the compressor to control the pressure level of the charge air supplied by the compressor;
   first controller means responsive to engine power setting above a predetermined low power setting for controlling the position of said valve means in response to engine power setting;
   second controller means for modulating the position of said valve means in response to variations in altitude during engine operation at said low power setting for controlling the compressor to provide charge air having a pressure according to a first functional relationship with altitude up to a predetermined altitude; and
   third controller means for modulating the position of said valve means in response to variations in altitude above said predetermined altitude during engine operation at said low power setting for controlling the compressor to provide charge air having a pressure according to a second functional relationship with altitude.

2. The control system of claim 1 wherein said valve means is movable between an open position to control the compressor to provide charge air having a pressure below compressor performance capacity and a closed position to control the compressor to provide charge air at a pressure substantially equalling compressor performance capacity.

3. The control system of claim 2 wherein the compressor is rotatably driven by a turbine driven by engine exhaust gases, and wherein said valve means comprises a waste gate valve for selective bypassing of a portion of the engine exhaust gases away from driving communication with the turbine.

4. The control system of claim 1 wherein said valve means comprises a control valve for controlling operation of the compressor, a positioning device for controllably positioning said control valve in response to the pressure of a fluid supplied thereto, and means for supplying said fluid under pressure to said positioning device, said first controller means being for controlling the pressure of said fluid supplied to said positioning device during engine operation above said low power setting, saie second controller means being for controlling the pressure of said fluid supplied to said positioning device up to said predetermined altitude during engine operation at said low power setting to control the position of said control valve, and said third controller means being for controlling the pressure of said fluid supplied to said positioning device above said predetermined altitude during engine operation at said low power setting to control the position of said control valve.

5. The control system of claim 4 wherein said second controller means includes means for progressively increasing the pressure of said fluid supplied to said positioning device upon increases in altitude during engine operation at said low power setting.

6. The control system of claim 1 wherein said second controller means comprises an absolute pressure controller for modulating the position of said valve means to control the compressor to provide charge air at a substantially constant absolute pressure up to said predetermined altitude during engine operation at said low power setting.

7. The control system of claim 1 wherein said third controller means includes means for modulating the position of said valve means in response to variations in altitude for controlling the compressor to provide charge air having a pressure which varies as a selected decreasing and substantially linear function with decreases in ambient pressure during engine operation at said low power setting.

8. The control system of claim 2 wherein said second controller means includes means for moving said valve means from said open position progressively toward said closed position upon increases in altitude, said valve means substantially reaching said closee position at said predetermined altitude, said third controller means including means for maintaining said valve means in an at least partly open position for a range of altitudes above said predetermined altitude.

9. The control system of claim 4 wherein said third controller means comprises means forming a flow path for flow of at least a portion of said fluid from said positioning device to reduce the pressure of said fluid supplied to said positioning device, a servo valve for opening and closing said flow path, and means responsive to the pressure of the charge air and to the pressure of ambient air to modulate the position of said servo valve for controlling flow of said fluid from said positioning device in a manner to cause said positioning device to adjustably position said control valve for controlling the compressor to vary the charge air pressure as a selected linear function of ambient pressure variations.

10. The control system of claim 9 wherein said pressure responsive means comprises a housing, a resilient diaphragm dividing said housing into a pair of chambers, and coupled with said servo valve to movably position said servo valve, means for communicating said charge air pressure and said ambient pressure to respective ones of said chambers, an evacuated bellows coupled between said diaphragm and said housing, and a spring reacting between said diaphragm and said housing, said diahragm and said bellows having predetermined effective relative areas exposed to the charge air pressure and to the ambient pressure and said spring having a predetermined spring force applied to said diaphragm such that said diahragm responds to altitude variations to move said servo valve for control of the charge air pressure according to said predetermined linear function.

11. The control system of claim 4 wherein said first controller means includes means forming a flow path for at least a portion of said fluid from said positioning device to a drain to reduce the pressure of said fluid in said positioning device, said second and third controller means each including means forming a flow path for at least a portion of said fluid and being coupled in parallel with each other between said first controller means and said drain.

12. In an engine system having an engine and a compressor for supplying charge air to the engine, and control valve means for controlling compressor operation, a control system for modulating the position of the control valve, comprising:

first controller means for controlling the position of the control valve during engine operation at a power setting above a predetermined low power setting;

second controller means responsive to altitude variations during engine operation at said low power setting for moving the control valve means progressively from a first position to control the compressor to provide charge air at a pressure less than compressor performance capacity to a second position upon increases in altitude to control the compressor to provide charge air at a pressure substantially equalling compressor performance capacity at a predetermined altitude; and third controller means for positioning the control valve means to control the compressor to provide charge air at a pressure slightly less than compressor performance capacity during engine operation at said low power setting through at least a range of altitudes above said predetermined altitude.

13. The control system of claim 12 wherein the control valve means is movable between an open position to control the compressor to provide charge air at a pressure less than compressor performance capacity and a closed position to control the compressor to provide charge air at a pressure substantially equalling compressor performance capacity.

14. The control system of claim 13 wherein the compressor is rotatably driven by a turbine driven by engine exhaust gases, and wherein said valve means comprises a waste gate valve for selective bypassing of a portion of the engine exhaust gases away from driving communication with the turbine.

15. The control system of claim 12 wherein said first controller means comprises means for adjusting the position of said control valve in response to engine power setting during engine operation at a power setting above said low power setting.

16. The control system of claim 12 wherein said third controller means positions the control valve means to control the compressor to provide charge air having a pressure which varies as a substantially linear function of ambient pressure.

17. The control system of claim 12 wherein the control valve means includes a control valve, a positioning device for controllably positioning the control valve in response to the pressure of a fluid supplied to said positioning device, and means for supplying said fluid under pressure to said positioning device, said first controller means being for controlling the pressure of said fluid supplied to said positioning device during engine operation at a power setting above said low power setting, said second controller means being for overriding said first controller means to control the pressure of said fluid up to said predetermined altitude during engine operation at said low power setting to control the position of said control valve, and said third controller means being for overriding said first controller means to control the pressure of said fluid supplied to said positioning device during engine operation at said low power setting and at altitudes above said predetermined altitude to control the position of said control valve.

18. The control system of claim 17 wherein said second and third controller means each include means forming a flow path for at least a portion of said fluid from said positioning device to a drain to reduce the pressure of said fluid in said positioning device, said second and third controller means being coupled in parallel with each other between said positioning device and said drain.

19. The control system of claim 18 wherein said first controller means includes means forming a flow path for at least a portion of said fluid and is coupled in series with said parallel second and third controller means.

20. The control system of claim 17 wherein said third controller means comprises means forming a flow path for flow of at least a portion of said fluid from said positioning device to reduce the pressure of said fluid in said positioning device, a servo valve for opening and closing said flow path, and means responsive to the pressure of the charge air and to the pressure of ambient air to modulate the position of said servo valve for controlling flow of said fluid from said positioning device in a manner to cause said positioning device to adjustably position said control valve for controlling the compressor to vary the charge air pressure as a selected linear function of ambient pressure variations.

21. The control system of claim 20 wherein said pressure responsive means comprises a housing, a resilient diaphragm dividing said housing into a pair of chambers, and coupled with said servo valve to movably position said servo valve, means for communicating said charge air pressure and said ambient pressure to respective ones of said chambers, an evacuated bellows coupled between said diaphragm and said housing, and a spring reacting between said diaphragm and said housing, said diaphragm and said bellows having predetermined effective relative areas exposed to the charge air pressure and to the ambient pressure and said spring having a predetermined spring force applied to said diaphragm such that said diaphragm responds to ambient pressure variations to move said servo valve for control of the charge air pressure according to said predetermined linear function.

22. In an engine system having an engine and a compressor for supplying charge air to the engine, a control system for controlling compressor operation in response to variations in altitude, comprising:

a control valve movable between an open position to control the compressor to provide charge air at a pressure less than compressor performance capacity and a closed position to control the compressor to provide charge air at a pressure substantially equalling compressor performance capacity;

primary controller means for adjusting the position of said control valve in response to engine power setting during engine operation at a power setting above a predetermined low power setting; and secondary controller means for overriding said primary controller means and for controlling the position of said control valve in response to variations in altitude during engine operation at said low power setting, said secondary controller means including a first controller device for progressively moving said control valve from said open position to said closed position upon increases in altitude, said control valve substantially reaching said closed position at a predetermined altitude, and a second controller device for maintaining said control valve in an at least slightly open position through a range of altitudes above said predetermined altitude.

23. In an engine system having an engine and a turbocharger including an engine exhaust gas driven turbine for rotatably driving a compressor to supply charge air to the engine, a control system for controlling the pressure of the charge air in response to altitude variations, comprising:

a waste gate valve movable between an open position to allow a portion of the engine exhaust gases to bypass the turbine whereby the compressor is rotated at a speed to supply charge air to the engine at a pressure less than compressor performance capacity for a selected engine power setting and a closed position to prevent bypass of exhaust gases around the turbine whereby the compressor is rotated at a speed to supply charge air to the engine at a pressure substantially equalling compressor performance capacity for said selected engine power setting;

a positioning device responsive to fluid pressure to control the position of said valve;

means for supplying a fluid under pressure to said positioning device;

primary controller means for adjusting the pressure of the fluid supplied to said positioning device to control the position of said control valve in response to altitude variations and in response to engine power setting during engine operation at a power setting above a predetermined low power setting; and secondary controller means for overriding said primary controller means during engine operation at said low power setting, said secondary controller means including a first controller device for controlling the pressure of said fluid supplied to said positioning device in response to altitude variations for selectively moving said valve from said open position to said closed position according to a first functional relationship with altitude up to a predetermined altitude, and a second controller device for controlling the pressure of said fluid supplied to said positioning device in response to altitude variations for maintaining said valve in an at least partly open position through a range of altitudes above said predetermined altitude.

24. The control system of claim 23 wherein said second controller device controls the pressure of said fluid for maintaining said valve in said at least partly open position to vary the pressure of the charge air substantially as a linear function of variations in ambient pressure.

25. The control system of claim 23 wherein said primary controller means and said first and second controller devices each include a flow path for passage of a portion of said fluid from said positioning device to a drain to control the pressure of said fluid supplied to said positioning device, said first and second controller devices being coupled in parallel with each other between said positioning device and said drain, and said first controller means being coupled in series with said parallel first and second controller devices.

26. The control system of claim 23 wherein said second controller device comprises means forming a flow path for flow of at least a portion of said fluid from said positioning device to reduce the pressure of said fluid in said positioning device, a servo valve for opening and closing said flow path, and means responsive to the pressure of the charge air and to the pressure of ambient air to modulate the position of said servo valve for controlling flow of said fluid from said positioning device in a manner to cause said positioning device to adjustably position said valve for controlling the compressor to vary the charge air pressure as a selected linear function of ambient pressure variations.

27. The control system of claim 26 wherein said pressure responsive means comprises a housing, a resilient diaphragm dividing said housing into a pair of chambers, and coupled with said servo valve to movably position said servo valve, means for communicating said charge air pressure and said ambient pressure to respective ones of said chambers, an evacuated bellows coupled between said diaphragm and said housing, and a spring reacting between said diaphragm and said housing, said diaphragm and said bellows having predetermined effective relative areas exposed to the charge air pressure and to the ambient pressure and said spring having a predetermined spring force applied to said diaphragm such that said diaphragm responds to ambient pressure variations upon changes in altitude to move said servo valve for control of the charge air pressure according to said predetermined linear function.

28. In an engine system having an engine and a compressor for supplying charge air to the engine, and a control valve for controlling compressor operation, a method of controlling the position of the control valve, comprising the steps of:
modulating the position of the control valve in response to engine power setting during engine operation at a power setting above a predetermined low power setting;
modulating the position of the control valve between a first position and a second position in response to variations in altitude up to a predetermined altitude during engine operation at the low power setting to control the pressure of charge air supplied to the engine according to a first functional relationship with altitude; and
modulating the position of the control valve in response to variations in altitude above the predetermined altitude during engine operation at the low power setting to control the pressure of charge air supplied to the engine according to a second functional relationship with altitude.

29. The method of claim 28 wherein said steps of modulating the position of the valve comprise moving the valve between an open position to control the compressor to provide charge air at a pressure less than compressor performance capacity at a selected engine power setting and a closed position to control the compressor to provide charge air at a pressure substantially equalling compressor performance capacity at the selected engine power setting.

30. The method of claim 29 wherein said step of modulating the position of the control valve in response to variations in altitude above said predetermined altitude comprises maintaining said control valve in an at least partly open position through a range of altitudes.

31. The method of claim 30 wherein said step of modulating the position of the valve above the predetermined altitude comprises positioning the valve to control the compressor to vary the pressure of the charge air as a decreasing and substantially linear function of decreases in ambient pressure.

32. The method of claim 28 including a positioning device for controllably positioning the valve in response to the pressure of a fluid supplied to the positioning device, and means for supplying a fluid under pressure to the positioning device, said steps of modulating the position of the valve comprising controlling the pressure of the fluid supplied to the positioning device with a first controller during engine operation at a power setting above the low power setting, and overriding the first controller during engine operation at the low power setting with a second controller for controlling the fluid pressure up to the predetermined altitude and with a third controller for controlling the fluid pressure at altitudes above the predetermined altitude.

33. The method of claim 32 including the steps of coupling the second and third controllers to the positioning device in parallel with each other, and coupling the first controller to the positioning device in series with the second and third controllers.

34. In an engine system having an engine and a compressor for supplying charge air to the engine, and a control valve for controlling compressor operation, a method of controlling the position of the control valve, comprising the steps of:
providing a positioning device responsive to a fluid pressure to move the valve between an open position to control the compressor to provide charge air at a pressure less than compressor performance capacity at a selected engine power setting and a closed position to control the compressor to provide charge air at a pressure substantially equalling compressor performance capacity at the selected engine power setting;
supplying a fluid under pressure from fluid supplying means to the positioning device;
controlling the flow of the fluid from the positioning device to a drain as a function of engine power setting during operation of the engine at a power setting above a predetermined low power setting to adjust the position of the valve in response to engine power setting;
progressively varying flow of the fluid from the positioning device to the drain during engine operation at the low power setting to control the pressure of the fluid supplied to the positioning device from a first pressure to position the valve in the open position to a second pressure to position the valve in the closed position upon increases in altitude up to a predetermined altitude to control the compressor to provide charge air at a pressure according to a first functional relationship with altitude; and allowing at least a relatively small flow of the fluid from the positioning device to the drain through at least a range of altitudes above the predetermined altitude during engine operation at the low power setting to control the pressure of the fluid supplied to the positioning device to position the valve to control the compressor to provide charge air at a pressure according to a second functional relationship with altitude.

35. In an engine system having an engine and a compressor for supplying charge air to the engine, and a control valve for controlling compressor operation, a method of controlling the position of the control valve, comprising the steps of:

modulating the position of the control valve with a primary controller in response to engine power setting during operation of the engine above a predetermined low power setting; and overriding the primary controller during engine operation at the low power setting, said overriding step including modulating the position of the control with one secondary controller to maintain charge air pressure substantially constant up to a predetermined altitude, and modulating the position of the control valve with another secondary controller to maintain the valve in an at least partly open position through a range of altitudes above the predetermined altitude.

* * * * *